United States Patent [19]

Sugimoto et al.

[11] 4,246,599
[45] Jan. 20, 1981

[54] ABNORMAL SEPARATION DETECTING CIRCUITS OF CHROMATIC SIGNALS OF SECAM SYSTEMS

[75] Inventors: Takashi Sugimoto, Yokohama; Hiroshi Takahashi, Ayase, both of Japan

[73] Assignee: Tokyo Shibaura Denki Kabushiki Kaisha, Japan

[21] Appl. No.: 73,493

[22] Filed: Sep. 7, 1979

[30] Foreign Application Priority Data

Sep. 13, 1978 [JP] Japan ............................... 53-112528

[51] Int. Cl.³ ............................................... H04N 9/47
[52] U.S. Cl. ........................................ 358/18; 358/23
[58] Field of Search ......................... 358/18, 19, 23, 14

[56] References Cited
U.S. PATENT DOCUMENTS

| 3,336,437 | 8/1967 | Brouard et al. | 358/18 |
| 3,555,174 | 1/1971 | Bruch | 358/18 |
| 4,072,983 | 2/1978 | Aschwanden | 358/19 |

Primary Examiner—John C. Martin
Attorney, Agent, or Firm—Finnegan, Henderson, Farabow, Garrett & Dunner

[57] ABSTRACT

Abnormal separation detecting circuit of chromatic signals transmitted by a SECAM system comprises a detection circuit which receives a chromatic signal made up of R-Y signals and B-Y signals respectively added with identification signals $I_1$ and $I_2$ at their front ends for detecting the identification signals $I_1$ and $I_2$ to produce currents corresponding to their frequencies, a differential amplifier comprising a pair of transistors ON OFF controlled by pulse signal of opposite signals which vary their phases in synchronism with the initiation of the periods of the R-Y signals and the B-Y signals of the chromatic signal and respectively applied to the base electrodes of the transistors, a current mirror circuit controlled its operation by the differential amplifier circuit, and a capacitor connected across the juncture of the current output terminal of the current mirror circuit and the current input terminal of the differential amplifier, and a reference potential point to be charged and discharged in accordance with the operation of the differential amplifier.

4 Claims, 17 Drawing Figures

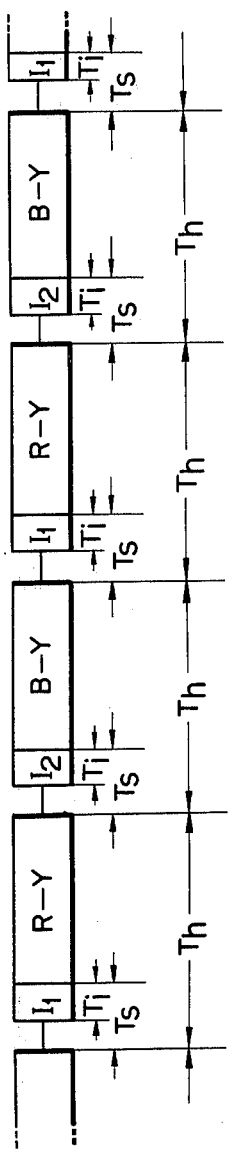
F I G. 1

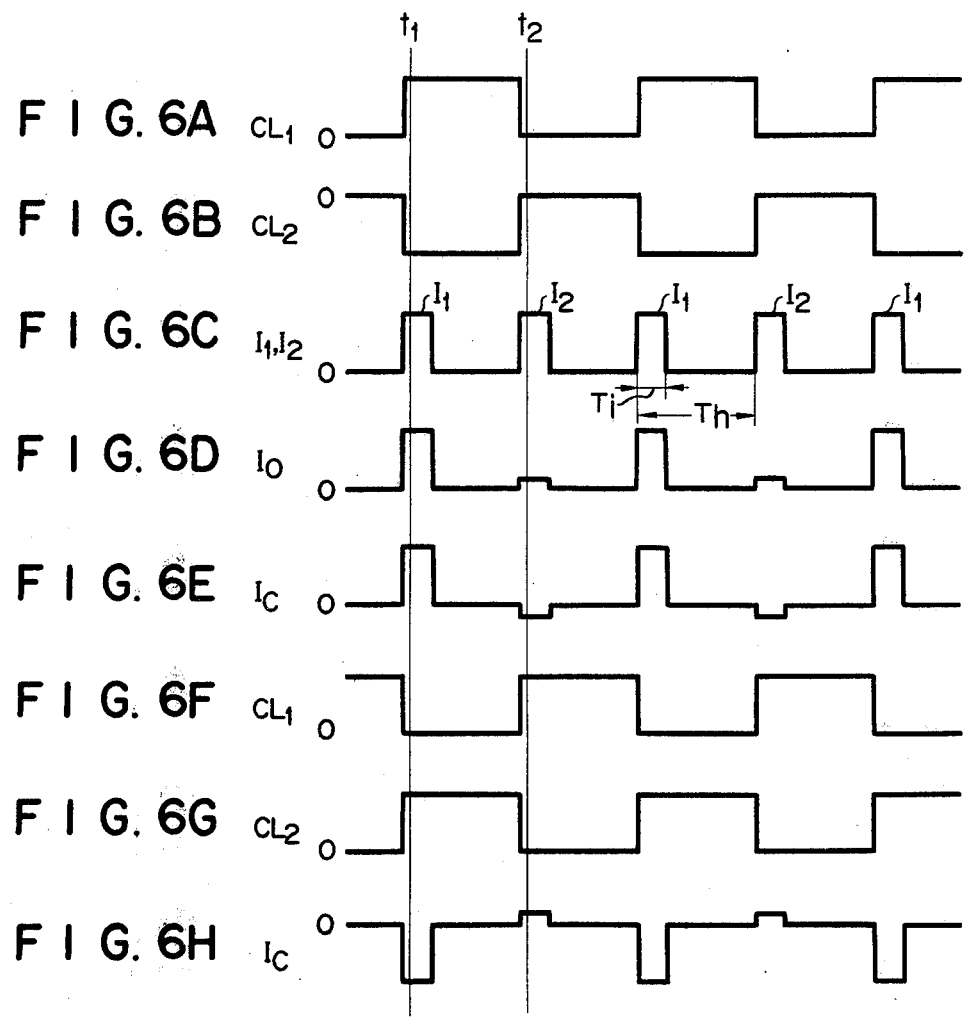

ABNORMAL SEPARATION DETECTING CIRCUITS OF CHROMATIC SIGNALS OF SECAM SYSTEMS

BACKGROUND OF THE INVENTION

This invention relates to an abnormal separation detecting circuit of chromatic signals which detects that whether series signals of R-Y signals and B-Y signals comprising color television chromatic signals which are transmitted according to a SECAM system are correctly separated according to a predetermined timing or not.

FIG. 1 shows one example of the construction of the chromatic signals utilized in the SECAM system and constituted by R-Y signals and B-Y signals which are transmitted alternately in each horizontal scanning period $T_h$. Between the R-Y and B-Y signals are interposed synchronizing signal periods $T_s$ containing identification signals $I_1$ and $I_2$ having different forms and utilized to show that a signal to be sent next time is an R-Y signal or a B-Y signal. The identification signal period is designated by $T_i$ in FIG. 1. More particularly, at the head of an R-Y signal is added an identification signal $I_1$ whereas an identifcation signal $I_2$ is added to the head of each B-Y signal.

In addition to the chromatic signals, a color television receiver also receives a brightness signal Y ($Y = \alpha R + \beta G + \gamma B$, where R, G and B represent red, green and blue color component, respectively). Based on these chromatic signal and the brightness signal are formed R, G, and B color signals which are used to display a picture image on a cathode ray tube.

On the receiving side R-Y signals and B-Y signals which are alternately sent in succession are connected into the form of parallel signals and R-Y signals and B-Y signals are separately derived out respectively by an R-Y signal receiving unit and a B-Y signal receiving unit.

FIG. 2 shows a converting and separating circuit which connects serially received R-Y signals and B-Y signals into parallel signals and to separate the R-Y signals and the B-Y signals under the control of suitable pulse signals. The converting unit is constituted by a delay circuit whereas the separating unit is constituted by two switches 14 and 16.

The delay circuit 12 operates to delay the R-Y signals and B-Y signals applied thereto by one horizontal scanning period $T_h$ (one R-Y signal period or one B-Y signal period) whereas the switches 14 and 16 are opened and closed in response to pulse signals $CL_1$ and $CL_2$ having opposite phases.

In the circuit shown in FIG. 2, a chromatic signal comprising serially transmitted R-Y and B-Y signals is applied to an input terminal $T_{in}$. The chromatic signal is applied to the input of the delay circuit 12 and to one stationary contacts 14a and 16a of the switches 14 and 16. The signal delayed by the delay circuit 12 is applied to the other stationary contacts 14b and 16b of the switches 14 and 16 which respectively receive pulse signals $CL_1$ and $CL_2$ having opposite phases and vary their levels in synchronism with the switching of the horizontal scanning period $T_h$ of the chromatic signals, to transfer their movable contacts 14c and 16c between the stationary contacts 14a, 14b and 16a, 16b. Thus, during one horizontal scanning period $T_h$, the switchs 14 and 16 are thrown to the stationary contacts 14b and 16a respectively whereas during the next horizontally scanning period to the stationary contacts 14a and 16b respectively.

In this manner, the R-Y signals and the B-Y signals which are alternately sent to the input terminal $T_{in}$ are supplied directly to switches 14 and 16 and indirectly supplied thereto via the delay circuit 12 which delays these signals by one horizontal scanning period $T_h$ (one R-Y signal period or one B-Y signal period) and by ON OFF controlling the two switches 14 and 16 according to a predetermined timing, only the R-Y signals can be derived out from an R-Y signal terminal $T_{R-Y}$, whereas only the B-Y signals can be deribed out from a B-Y signal terminal $T_{B-Y}$.

The converting and separating circuit shown in FIG. 2 operates as follows.

The converting and separating circuit is designed such that concurrently with the application of a B-Y signal upon the input terminal $T_{in}$, the movable contacts 14c and 16c are thrown to the stationary contacts 14b and 16a as shown in FIG. 2. On the other hand, when an R-Y signal is applied, the movable contacts 14c and 16c are thrown to the stationary contacts 14a and 16b respectively. The timing of transfer of the switches 14 and 16 is controlled by signals $CL_1$ and $CL_2$ respectively. Suppose now that the levels of the pulses $CL_1$ and $CL_2$ vary at a predetermined timing and hence the switches 14 and 16 are transferred in a predetermined manner, whereby the movable contacts 14c and 16c are thrown to the stationary contacts 14b and 16a respectively concurrently with the application of the B-Y signal upon the input terminal $T_{in}$.

At this time, the stationary contact 16a of switch 16 is supplied with the B-Y signal supplied to the input terminal $T_{in}$, and this signal B-Y appears at the output terminal $T_{B-Y}$ via switch 16. Under these condition, the delay circuit 12 produces an R-Y signal one period before B-Y signal now being applied to the input terminal $T_{in}$, and this R-Y signal appears at the output terminal $T_{R-Y}$ via the movable contact 14b of switch 14.

Where an R-Y signal is applied to the input terminal $T_{in}$ since switches 14 and 16 are transferred at the same time with the application of the R-Y signal as above described so that the movable contacts 14c and 16c are thrown to the stationary contacts 14a and 16b concurrently with the application of the R-Y signal.

At this time, the R-Y signal applied to the input terminal $T_{in}$ appears on the output terminal $T_{R-Y}$ via switch 14. On the other hand the delay circuit 12 produces a B-Y signal one horizontal scanning period before the R-Y signal now being received by the input terminal $T_{in}$, and this B-Y signal appears on the B-Y signal output terminal $T_{B-Y}$.

In this manner, so long as the timing of switching of signals R-Y and B-Y which are received alternately and the timing of varying the levels of the pulse signals $CL_1$ and $CL_2$ that control the operation of switches 14 and 16 are synchronous, signals R-Y and B-Y which are sent alternately are perfectly isolated so that signal R-Y would be produced only at the output terminal $T_{R-Y}$ whereas signal B-Y would be produced only at the output terminal $T_{B-Y}$. Accordingly clear picture images would be displayed on the cathode ray tube.

However, should the timing shift, for example by one horizontal scanning period with respect to a prescribed timing the shape of the signal derived out from output terminals 14 and 16 would be reversed.

For this reason, in order to obtain clear picture images it is necessary to constantly supervize whether signals R-Y and B-Y are perfectly isolated or not.

To this end, as shown in FIG. 1, identification signals $I_1$ and $I_2$ which are to be modulated and respectively having frequencies of about 4.2 MHz and about 4.4 MHz are added to the heads of signals R-Y and B-Y respectively. Descrimination of these identification signals $I_1$ and $I_2$ makes it possible to known the type of the signals now being received (R-Y signal or B-Y signal) and the fact that these signals are perfectly isolated or not.

However, a prior art detection circuit utilized for this purpose utilizes a number of capacitors so that in order to fabricate it with an integrated circuit, it is necessary to provide a number of external terminals for connection of the capacitors thus making it impossible to fabricate the circuit with an integrated circuit.

SUMMARY OF THE INVENTION

Accordingly, it is an object of this invention to provide a novel abnormal separation detecting circuit of chromatic signals utilized in a SECAM system which can check as to whether R-Y and B-Y signals are correctly separated or not with a preset timing and is suitable to be fabricated with integrated circuits.

According to this invention there is provided an abnormal separation detecting circuit of chromatic signals sent by a SECAM system comprising a current mirror circuit, a differential amplifier circuit including a pair of transistors with their base electrodes connected to respectively receive pulse signals of opposite phases for controlling the operation of the current mirror circuit, the levels of the pulse signals varying in synchronism with the beginning of the periods of an R-Y signal and a B-Y signal contained in the chromatic signal; and detecting means for detecting identification signals added to front ends of the B-Y signal and the B-Y signal for identifying the R-Y and B-Y signals thereby generating a current having a magnitude corresponding to frequencies of the detected identification signals, a capacitor connected between a current output terminals of the current mirror circuit and a point of reference potential to be charged and discharged in response to the operation of the differential amplifier circuit, and means connected across the capacitor for supplying thereto a constant voltage.

BRIEF DESCRIPTION OF THE DRAWINGS

Further objects and advantages of the invention can be more fully understood from the following detailed description taken in conjunction with the accompanying drawings in which:

FIG. 1 is a diagrammatic representation showing a construction of chromatic signals utilized in a SECAM system;

FIGS. 5A through 5E are timing charts at various portions of the detection circuit shown in FIG. 3 and helpful to explain the operation thereof; in which FIGS. 5A and 5B show the waveforms of pulse signals $CL_1$ and $CL_2$;

FIG. 5C shows only an identification signal component contained in a chromatic signal;

FIG. 5D shows the waveform of the output current of a detector in the detection circuit;

FIG. 5E shows the waveform of the charging and discharging current of a capacitor; and FIGS. 6A through 6H and timing charts at various portions of the detection circuit shown in FIG. 3 and helpful to explain the operation thereof in which FIGS. 6A and 6B show the waveforms of pulse signals $CL_1$ and $CL_2$;

FIG. 6C shows the identification signal contained in the chromatic signal;

FIG. 6D shows the output current waveform of a detector in the detection circuit;

FIG. 6E shows the waveform of the charging and discharging current of a capacitor in the detector;

FIGS. 6F and 6G show waveforms of the pulse signals $CL_1$ and $CL_2$; and

FIG. 6H shows the waveform of the charging and discharging current of the capacitor.

DESCRIPTION OF THE PREFERRED EMBODIMENT

Figure 2:
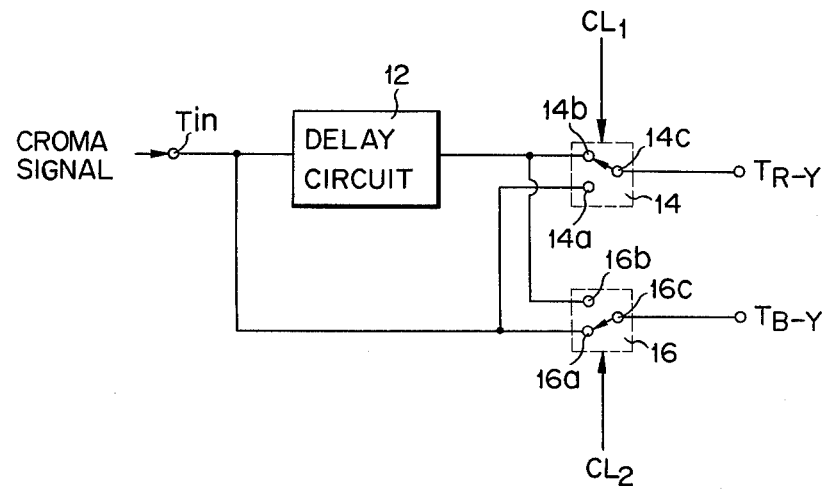
FIG. 2 shows a chromatic signal separation circuit utilized to separate R-Y signals and B-Y signals constituting a chromatic signal.
Figure 3:
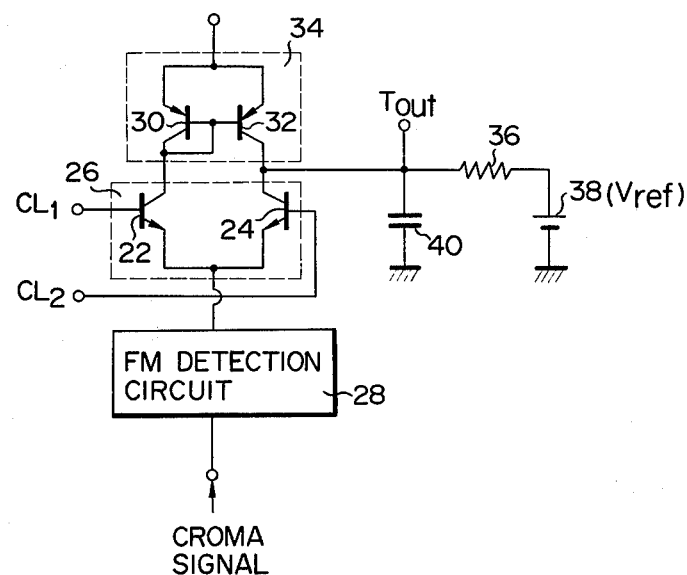
FIG. 3 is a connection diagram showing an abnormal separation of chromatic signals embodying the invention.

FIG. 3 shows one embodiment of a detection circuit for detecting abnormal separation of a chromatic signal embodying the invention. There are provided two NPN type transistors 22 and 24 with their base electrodes applied with opposite phase pulse signals $CL_1$ and $CL_2$ applied to the switches 14 and 16 in the circuit of FIG. 2 so as to be rendered ON and OFF. Thus, these transistors 22 and 24 constitute a differential amplifier 26. The emitter electrodes of transistors 22 and 24 are commonly connected to an FM detection circuit 28 which is connected to receive a chromatic signal applied to the input terminal $T_{in}$ shown in FIG. 2 for detecting the chromatic signal with a center frequency 4.3 MHz, for example, only during the period of the identification signal. As can be noted from the detection characteristic curve shown in FIG. 4, the detection circuit 28 operates to pass a maximum current when it receives a signal of 4.2 MHz and to reduce to zero the current when it receives a signal of 4.4 MHz. Accordingly, by setting the identification signals $I_1$ and $I_2$ for the R-Y and B-Y signals of the chromatic signal to be 4.2 MHz and 4.4 MHz respectively the output current of the detection circuit varies between the maximum and minimum (substantially zero) values in accordance with the receiption of the identification signals $I_1$ and $I_2$.

The collector electrode of transistor 22 is connected to the collector and base electrodes of a PNP type transistor 30, whereas the collector electrode of transistor 24 is connected to the base electrode of transistor 32. The collector electrodes of transistors 30 and 32 are commonly connected to a source of supply having a voltage level $V_{cc}$, and the base electrodes of transistors 30 and 32 are connected with each other.

Thus, transistors 30 and 32 cooperate to constitute a current mirror circuit 34 with the collector electrode of transistor 32 utilized as a current output terminal. The operation of the current mirror circuit 34 is controlled by the detection circuit 28.

Across the junction between collector electrodes of transistors 32 and 24 and the ground are connected a series circuit including a resistor 36 and a source 38 having a voltage level of $V_{ref}$, and a capacitor 40 is connected across the series circuit. A terminal of the capacitor on the opposite side of the ground is connected to an output terminal $T_{out}$.

The operation of the abnormal separation detection circuit will now be described hereunder with reference to the timing charts shown in FIGS. 5A through 5E and FIGS. 6A through 6H.

A case wherein no identification signal is added to the incoming chromatic signals will firstly be considered. It is now supposed that pulse signals $CL_1$ and $CL_2$ having opposite phases as shown in FIG. 5A and 5B are applied to the base electrodes 22 and 24 respectively.

Figure 4:
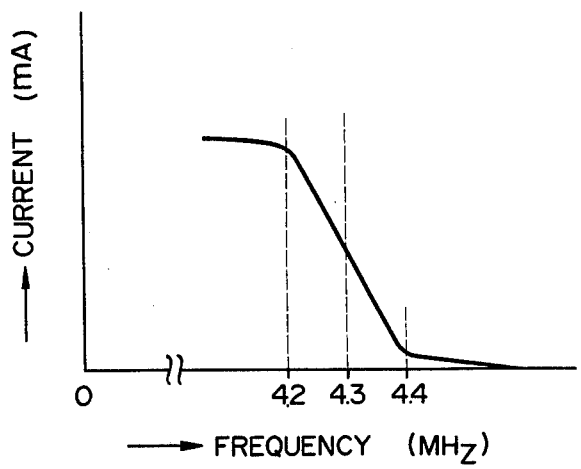
FIG. 4 is a graph showing the wave detection characteristics of an FM detection circuit utilized in the detection circuit shown in FIG. 3.
Figure 4:
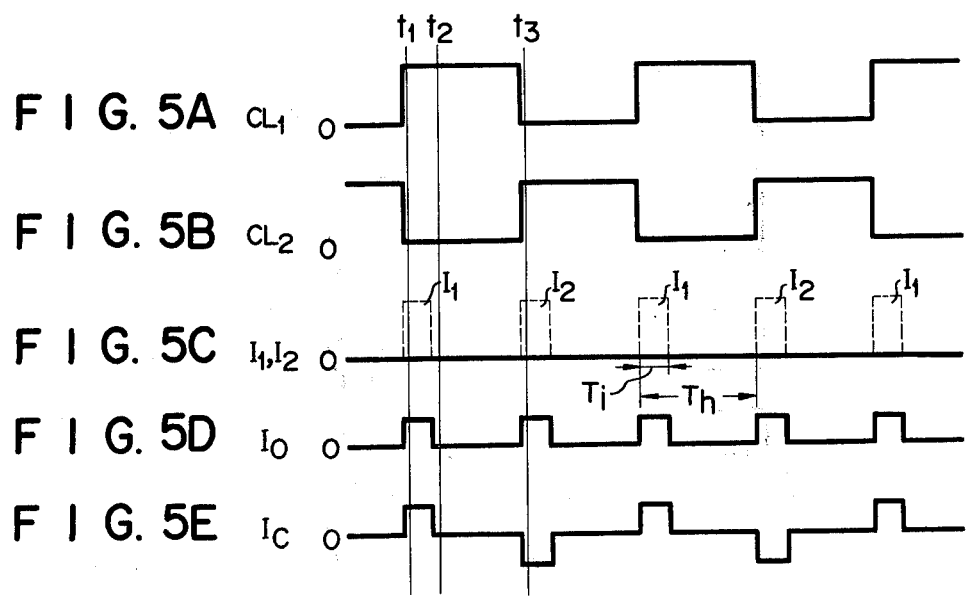

Although the FM detection circuit 28 detects the identification signals $I_1$ and $I_2$ when it is supplied with a chromatic signal, where no identification signals $I_1$ and $I_2$ are added to the received chromatic signal (FIG. 5C) a current (shown in FIG. 5D) about one half of the current which flows when an identification signal $I_1$ is detected would flow through the detection circuit 28 as shown by the detection characteristic shown in FIG. 4. FIG. 5C shows only the identification component included in the chromatic signal. However, at the present stage of description as it was assumed that no identification signals $I_1$ and $I_2$ are contained, no identification signals $I_1$ and $I_2$ presents. However, phantom identification signals $I_1$ and $I_2$ are shown by dotted lines. Accordingly, if either one of the transistors 22 and 24 is conductive, current would flow through the conductive transistor.

Let us assume now that pulse signal $CL_1$ is at a high level and that pulse signal $CL_2$ at a low level at time $t_1$. At this time, transistor 22 becomes ON but transistor is OFF. When the transistor 22 turns ON it passes current and hence through transistor 30.

Accordingly, current also flows through transistor 32 which constitutes the current mirror circuit 34 together with transistor 30. However, since at this time, transistor 24 is OFF the current flowing through transistor 32 would flow into capacitor 40 as shown in FIG. 5E instead of flowing into transistor 24, as shown in FIG. 5E. As has already been pointed out, the detection circuit 28 operates during only the identification signal period $T_i$ of the received chromatic signal. Consequently, after elapse of the identification signal period (time $t_2$) no current would flow into the capacitor 40 (FIG. 5E).

Where the pulse signal $CL_1$ changes to a low level and $CL_2$ to a high level at time $t_3$ transistor 22 turns OFF whereas transistor 24 turns ON, with the result that current flows through transistor 24. Since transistor 22 is OFF no current flows through transistor 30, with the result that current would not flow through transistor 32. Thus, the current flowing through transistor 24 is the discharge current from capacitor 40 (FIG. 5E), Since the same operation is repeated sequentially, the waveforms of the charging and discharging currents of capacitor 40 are shown by FIG. 5E, in which the positive side shows the charging current, while the negative side the discharge current.

As can be noted from FIG. 5E, the mean value of the current flowing through the capacitor 40 is zero whereas the mean voltage thereof is equal to the potential $V_{ref}$ of the source 38. In other words, the fact that the potential of capacitor 33 is equal to $V_{ref}$ means that the received chromatic signal is not added with any identification signal. A case will now be described in which the received chromatic signal contains identification signals, and the input timings of signals R-Y and B-Y and the timing of varying the levels of pulse signals $CL_1$ and $CL_2$ (FIGS. 6A and 6B) are precisely synchronous so that signals R-Y and B-Y are correctly separated. In this example, it is assumed that at the time of receiving the signal R-Y, that is at the time of detecting the identification signal $I_1$, the pulse signals $CL_1$ and $CL_2$ are set to high and low levels respectively. In other words when signal B-Y is received, that is when the identification signal $I_2$ is detected pulse signals $CL_1$ and $CL_2$ are set to low and high levels respectively.

Where the chromatic signal contains identification signals $I_1$ and $I_2$ (FIG. 6C) the current flowing through the detection circuit 28 would vary. More particularly, as can be noted from FIG. 4, where the detection circuit 28 detects the identification signal $I_1$ the maximum current flows (FIG. 6D) and when the identification signal $I_2$ is detected, the detected current reduces substantially to zero.

Consequently, when no current flows through the detection circuit 28, even when transistors 22 and 24 are turned ON, no current flows therethrough.

Let us consider this phenomena in more detail. Assume now that pulse signals $CL_1$ and $CL_2$ (FIGS. 6A and 6B are at high and low levels, respectively (at time $t_1$) and hence transistors 22 and 24 are rendered ON and OFF respectively. At this time $t_1$ when the detection circuit 28 detects the identification signal $I_1$ the detection circuit 28 would produce the maximum current (FIG. 6D). Since current flows through the detection circuit 28, current also flows through transistors 22 and 30 which are now in their conductive state. As the current flows through transistor 30, current also flows through transistor 32. At this time since transistor 24 is turned OFF, the current that flows through transistor 32 would flow into capacitor 40 (FIG. 6E).

Assume now that pulse signals $CL_1$ and $CL_2$ invert their polarities to become low and high levels respectively and that transistors 22 and 24 are turned OFF and ON respectively at time $t_2$. At this time, since the detection circuit 28 detects the identification signal $I_2$, as can be noted form the detection characteristic thereof shown in FIG. 4, any appreciable current does not flow as shown in FIG. 6D. For this reason, it is evident that no current flows through transistor 22 which is now in its OFF state and no current also flows through transistor 24 in the ON state. Under these conditions, the current flowing through the capacitor 40 is its discharge current passing through resistor 36.

By repeating the operation described above, the waveform of the current flowing through the capacitor 40 can be shown by FIG. 6E.

As can be clearly noted from FIG. 6E, the mean current flowing through the capacitor 40 would have a positive value and the mean voltage thereacross is shown by $$V_{ref}+I_0R_I(T_i/2T_h)$$

where Io represents the charging current of the capacitor and $R_I$ the resistance value of resistor 36, $T_h$ one horizontal scanning period and $T_i$ the period of the identification signal.

Let us now consider a case in which a received chromatic signal contains identification signals and the timing of varying the levels of the pulse signals $CL_1$ and $CL_2$ is shifted from the input timing of the R-Y or B-Y signal by one horizontal scanning period $T_h$ so that signals B-Y and R-Y are not seperated completely as desired. More particulary, as shown in FIGS. 6F and 6G when the phases of the pulse signals $CL_1$ and $CL_2$ are different from the phase of the identification signals shown in FIG. 6C, at time $t_1$, the identification signal $I_1$ (FIG. 6C) is detected by the detecting circuit 28 and the pulse signals $CL_1$ and $CL_2$ at low and high levels respectively, as shown in FIGS. 6F and 6G. Consequently, the detection circuit 28 produces the maximum current (FIG. 6D) and transistors 22 and 24 are OFF and ON respectively, with the result that current flows through transistor 24. However, since transistor 22 is OFF, no current flows therethrough. Hence current does not flow through transistors 30 and 32. Thus, the current flowing through transistor 24 is the discharge current caused by charge which has been stored in transistor 24 (FIG. 6A).

At time $t_2$, the identification signal $I_2$ (FIG. 6C) is detected and the pulse signals $CL_1$ and $CL_2$ (FIGS. 6F and 6G) are at high and low levels respectively. For this reason, the current (FIG. 6D) flowing through transistor 28 at this time is substantially zero and transistors 22 and 24 are turned ON and OFF respectively. Since substantially no current flows through the detection circuit 28 no current flows through transistor 22 although it has been turned ON. Since transistor 24 is OFF, no current flows therethrough, and also transistor does not pass current. Since no current flows through transistor 30, transistor 32 too does not pass current. Accordingly, at this time, only a small changing current flows into capacitor 40 from source 38 (FIG. 6H).

Similar operation is repeated so that the current that flows through capacitor 40 will vary in a manner as shown in FIG. 6H.

As can be noted from the current wave form $I_c$ shown in FIG. 6H, the mean current flowing through capacitor 40 would have a negative value and the mean voltage of the capacitor 40 is expressed by $$V_{ref} - IoR_f(T_i/2T_h)$$

Where the phases of the pulse signals $CL_1$ and $CL_2$ are different from the prescribed timing by one horizontal scanning period ($CL_1$ and $CL_2$ shown in FIGS. 6F and 6G) the means voltage of the capacitor 40 would be lower than the voltage $V_{ref}$ of the source.

As can be clearly noted from foregoing description made by using the time charts shown in FIG. 5A through 5E and FIGS. 6A through 6H, the waveform of the current flowing into and out of the capacitor 40 varies dependent on whether the identification signals $I_1$ and $I_2$ are added or not added, or even when they are added whether signals R-Y and B-Y are correctely separated or not thus causing the mean voltage of the capacitor to vary. Accordingly, the fact that whether signals R-Y and B-Y are correctly separated or not can readily be judged by detecting the terminal voltage $V_c$ of the capacitor 40 which appears at the output terminal $T_{out}$.

The detecting circuit of this invention shown in FIG. 3 utilizes only one capacitor even when the circuit is fabricated with an integrated circuit it is necessary to provide only one external terminal for connecting a capacitor. Thus, the circuit shown in FIG. 3 is suitable to be fabricated with an integrated circuit.

Although in the foregoing embodiment, the levels of the pulse signals $CL_1$ and $CL_2$ were set such that they will have high and low levels respectively when an R-Y signal is received, it is also possible to set such that the pulse signals $CL_1$ and $CL_2$ will have high and low levels respectively when the R-Y signal is received. The two transistors 22 and 24 comprising a differential amplifier are not limited to NPN type but may be PNP type. In which case two transistors 30 and 32 consituting the current mirror circuit 34 should also of the PNP type.

What we claim is:

1. An abnormal separation detecting circuit of chromatic signals sent by a SECAM system comprising
    a current mirror circuit,
    a differential amplifier circuit including a pair of transistors with their base electrodes connected to respectively receive first and second pulse signals of opposite phases for controlling the operation of said current mirror circuit, the levels of said first and second pulse signals varying in synchronism with the begining of periods of an R-Y signal and a B-Y signal contained in said chromatic signal;
    detecting means for detecting identification signals added to front ends of said R-Y signal and said B-Y signal for identifying said R-Y and B-Y signals thereby generating a current having a magnitude corresponding to frequencies of the detected identification signals,
    a capacitor connected between a current output terminal of said current mirror circuit and a point of reference potential to be changed and discharged in response to the operation of said differential amplifier circuit; and
    means connected across said capacitor for supplying thereto a constant voltage.

2. The detecting circuit according to claim 1 which further comprises a resistor connected between said capacitor and said constant voltage supply means.

3. The detecting circuit according to claim 1 wherein said first and second pulse signals are at high and low levels at the time of commencement of an R-Y signal period.

4. The detecting circuit according to claim 1 wherein said first and second pulse signals are at low and high levels respectively as the time of commencement of a B-Y signal period.

* * * * *